United States Patent [19]
Hutchinson

[11] Patent Number: 5,847,288
[45] Date of Patent: Dec. 8, 1998

[54] PHOTO DETECTOR BENDING BEAM FLOW SWITCH AND FLOW METER

[75] Inventor: Harold D. Hutchinson, Oxnard, Calif.

[73] Assignee: Harwill Corporation, Oxnard, Calif.

[21] Appl. No.: 835,102

[22] Filed: Apr. 4, 1997

[51] Int. Cl.$^6$ .............................. G01F 1/28; G01F 15/00
[52] U.S. Cl. .................................. 73/861.75; 73/861.77
[58] Field of Search .......................... 73/861.71, 861.73, 73/861.74, 861.75, 861.77; 220/81.9 R, 81.9 M; 340/606, 610

[56] References Cited

U.S. PATENT DOCUMENTS

| | | | |
|---|---|---|---|
| 4,172,381 | 10/1979 | Aigner | 73/861.77 |
| 4,295,044 | 10/1981 | Anderson et al. | 73/861.74 |
| 4,791,414 | 12/1988 | Griess | 340/610 |
| 4,945,344 | 7/1990 | Farrell et al. | 73/861.74 |
| 4,958,144 | 9/1990 | Griess | 340/606 |
| 5,021,619 | 6/1991 | Hutchinson | 73/861.77 |
| 5,383,470 | 1/1995 | Kolby | 73/861.74 |
| 5,542,302 | 8/1996 | McMillan et al. | 73/861.77 |
| 5,668,327 | 9/1997 | Amemori et al. | 73/861.77 |

Primary Examiner—Richard Chilcot
Assistant Examiner—Harshad Patel
Attorney, Agent, or Firm—David O'Reilly

[57] ABSTRACT

A photo detecting flow sensing bending beam fluid flow switch and flow meter system having blocking targets that selectively block the optical path from an emission source to a photodetector. The device provides a system which is very sensitive to fluid flow in a pipe, container or duct by providing a shaped flexible flow sensitive bending beam having a blocking target which is bent so that the portion of the blocking target is displaced between the emission source and a photodetector. The shaped blocking target is configured to either interrupt or permit the transmission of emission from the emitter to the photodetector. The presence or absence of the source represents the presence or absence of a fluid flow rate above or below a selected value thus, performing a fluid flow switch function. By modifying the blocking target to provide a reflective control from an emission to a photo detector or an absorption of the emission by a target varying in opacity, the relative light output is continuously modulated to produce a voltage output directly proportional to the rate of fluid flow past the target on a flow sensitive bending beam. In an optional embodiment, flow sensitivity is improved by adding vortex shedding enhancements to the flow sensitive bending beam. This combination of functional elements can provide an analog fluid flow meter transducer for flow metering, totalizing in a flow monitoring system having single or multiple flow switching set points.

24 Claims, 13 Drawing Sheets

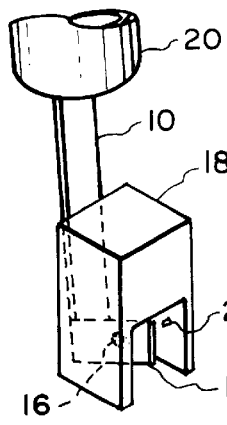 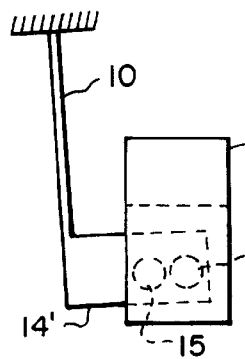 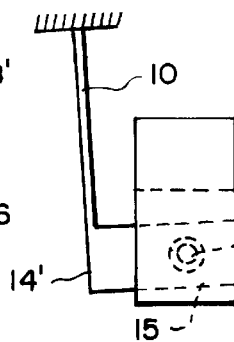 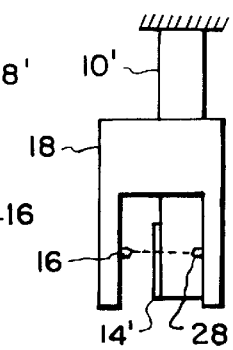
Fig. 3a.   Fig. 3b.   Fig. 3c.   Fig. 3d.
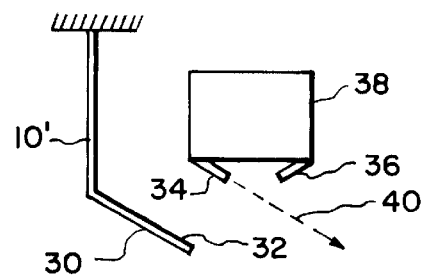 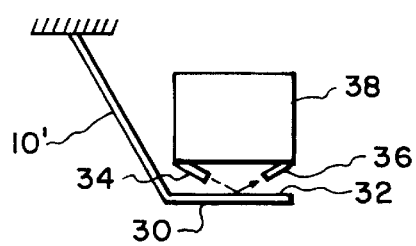
Fig. 4a.   Fig. 4b.
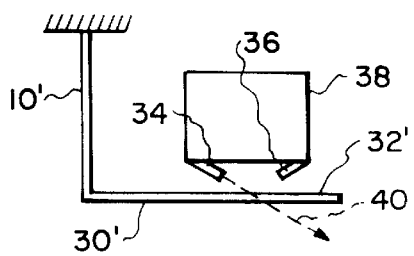 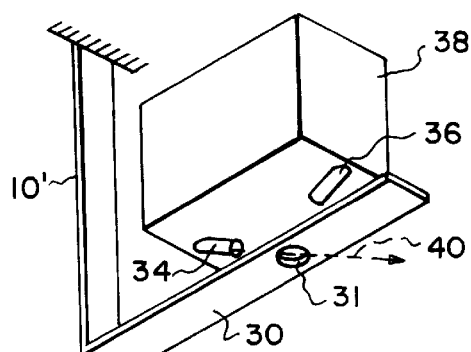
Fig. 5a.   Fig. 5b.

PHOTO DETECTOR BENDING BEAM FLOW SWITCH AND FLOW METER

BACKGROUND OF THE INVENTION

1. Field of the Invention

This invention relates to fluid flow control and metering, and more specifically relates to a fluid flow switching system that employs a photodetector and light source to provide a system sensitive to flow.

2. Background Information

The invention disclosed herein is an improvement to the flow switch disclosed and described in U.S. Pat. No. 5,021,619 issued Jun. 4, 1991 to the inventor of the invention disclosed herein and is incorporated herein by reference. This prior patent essentially shows a cantilevered flat flow sensing spring blade disposed to extend into the flow of a fluid through a container, pipe, tube, duct, etc. which produces a drag force on a target blade, displacing it in a downstream direction. The fluid flowing through the pipe bends the spring until it comes to rest against a hollow support tube that is located just downstream of the spring. The support tube holds the spring steady; thus, protecting it from excessive vibration induced by turbulent fluid flow plus static loads due to steady state fluid flow loads.

In the prior patent referred to hereinabove, a magnet on the flow sensing spring blade activates a reed switch inside the support tube. Fluid flow acting on the spring blade moves the magnet toward the support tube thereby, indicating a certain level of flow. The triggering fluid flow rate can be determined by adjusting the size, shape and stiffness of the spring blade.

However, magnetically operated reed switches have an inherent hysteresis. As the magnet approaches the reed switch at some point, the magnet is attracted to the switch by magnetic field coupling and quickly moves the last bit of distance to the support tube under the influence of the magnetic force alone, rather than because of force of the fluid flow against the flow target's spring blade which thus, introduces some error in the flow measurement.

An additional mechanical hysteresis effect is present in the reed switch itself, which once closed, tends to latch in the closed position via non-linear magnetic attraction. Therefore, as the fluid flow declines, the reed switch will remain latched closed until the external magnetic coupling force effecting the reed switch is no longer sufficient to maintain the latched condition and the reed switch contact open. Thus, the fluid flow rate, when the switch opens, is somewhat below the fluid flow rate at which the switch closes (a hysteresis effect). This hysteresis effect or gap is again, in many situations, a useful feature in that it prevents the switch from oscillating (i.e., chattering on and off) when the fluid flow happens to be right at the triggering point. In effect, the double magnetic latch/unlatch hysteresis of the magnet and reed switch internal blades creates a fluid flow hysteresis dead band, which reduces flow measuring sensitivity. The magnetic hysteresis system and thus, the flow turbulence hysteresis system is completely determined by local magnetic fields of the magnet/reed switch combination, which is an artifact of each particular magnet/reed combination that cannot be adjusted except by changing one or both members.

A further improved system, to reduce this hysteresis effect is disclosed and described in U.S. Pat. application Ser. No. 08/736,050. In this improved fluid flow switch and metering system, the reed switch is replaced with a Hall Effect transducer which has greater sensitivity than a reed switch and provides an output depending upon the magnetic force applied to it by a magnet. In this patent application various configuration and combinations of magnets, including various materials are disclosed, that effect the output of the Hall Effect transducer. Substantial improvement in the sensitivity and reduction in the hysteresis makes this system useful in many applications. However, even greater sensitivity, particularly a low flow rate is needed.

Fluid flow devices having a light detecting device are known in the art. One such device is shown in U.S. Pat. No. 4,945,344 of Farrell et al. In this patent, an electro-optical slide has a reflector that reflects light from a light source to a detector. This device employs a complicated arm having a ball bearing and spring mounted on a rubber boot that allows the vein to be deflected by fluid flow. The device disclosed in the Farrell Patent is not versatile or sensitive enough for most applications as the detection mode is separated from the optics. The device has a seal or boot around the arm makes this device sensitive to fluid pressure. Further, the friction of the ball detent in the flow sensitive arm would make this device unworkable at low flow rates. There are additional defects in the window and the slide mechanism. If the seal is not fluid tight the window will quickly become contaminated and the slide will fail or stick. Further there is no convenient way to clean the window. At best, this device may only be used as an on/off indicator.

Another patent that uses a light source and photo detector for determining fluid flow as it flows is disclosed in U.S. Pat. No. 4,958,144 of Greiss. The device disclosed in the Greiss patent needs a heavy seal which eliminates the possibility of any useful sensitivity except as an on/off indicator. Further, the heavy seal means this device is very pressure dependent. Also, the large vane, heavy seal separating the optics, and spring loaded sensor mechanism means this device is not very sensitive to flow. It is a simple on/off device. Another disadvantage is the large vane that is necessary as this device needs a big target. The large vane can completely choke off or block flow. Both patents cited above suffer from low turn down ratios (i.e., the ratio of maximum allowable flow rate divided by the minimum detectable flow rate) on the order of ten (10) or less.

Another object of the present invention is to provide a flow metering and switching system having a turn down ratio (i.e., maximum flow/minimum detected flow= turndown) on the order of one hundred (100+) or more.

Therefore, it is one object of this invention to employ a non-magnetic optical micro-sensor transmitter receiver pair operating in both transmissive and reflective modes thereby, totally eliminating the use of magnetics and associated magnetic hysteresis effects.

Yet another object of the present invention is to employ a non-magnetic optical micro-sensor transmitter receiver pair that provides a very narrow on/off flow switch operating band thus, providing an extremely sensitive flow measurement device, which is precisely repeatable and essentially free of meaningful hysteresis.

Still another object of the present invention is to provide a flow metering and switching system employing a photo detector and a light beam interrupter that has a variety of characteristics. The radiation beam source and photo detector combination can be broad spectrum from x-ray to ultraviolet, to visible to infrared and beyond, depending upon each particular situation.

Still another object of the present invention is to provide a flow metering and switching system in which the flow is determined by blocking or interrupting the path of light between a source and a photo detector.

Yet another object of the present invention is to provide a flow metering and switching system in which a blocking or interrupting mechanism is provided via a fluid flow sensing bending beam to selectively control the interruption of light between a source and a photo detector.

Yet another object of the present invention is to provide a flow metering and switching system having a blade mounted on a fluid flow sensing bending beam that selectively blocks the path of light from a source to a photo detector.

Yet another object of the present invention is to provide a flow metering and switching system in which the flow sensing blade is an opaque member that blocks the transmission of light from the source to a photo detector.

Still another object of the present invention is to provide a flow metering and switching system in which the blade mounting on a flow sensing bending beam has a varying opacity to gradually diminish the light transmitted from a source to a photo detector.

Yet another object of the present invention is to provide a flow metering and switching system in which a reflective surface is mounted on a flow sensing bending beam to control or reflect light from a source to a photo detector.

Still another object of the present invention is to provide a flow metering and switching system having a means to block the light flowing from a light source to a photo detector in which the light source is a LED optical disc transmitter and the photo detector receiver is an optical disc receiver.

Yet another object of the present invention is to use a variety of blocking or interrupting devices to vary the relative light received by a photo detecting devices Still another object of the present invention is to use an interrupting blade having a male shaped blocking configuration.

Yet another object of the present invention is to provide a flow control, or flow metering switching have a female shaped blocking blade configuration for varying the light between a source and a photo detector.

Still another object of the present invention is to use a variety of reflective surfaces to vary the quantity of light received by a photo detecting device from a light source. These blocking blades could have a surface that is partially reflecting, and partially non-reflecting. In some cases, the reflecting areas may be separated by an oblique line providing a triangular reflective surface and a triangular non-reflective surface. In another embodiment, the reflective surface would be one-half of a square or rectangle, while the non-reflecting surface would cover the other half.

Yet another object of the present invention is to provide a selective radiation absorption flow sensing blade having a varying opacity from clear to completely opaque. The flow sensing blade would be clear at a forward edge and would become increasingly opaque toward a rear edge until it was completely opaque to the light source or vice versa.

Another object of the present invention is to provide a flow switch and meter that has improved sensitivity by measuring the variation in light detected by a photo detector caused by fluid flow vortex shedding at, or down stream of the flow of a flow sensitive bending beam.

Yet another object of the present invention is to provide a flow switch and meter that includes appendages on a bending beam to enhance the vortex shedding to further improve sensitivity.

BRIEF DESCRIPTION OF THE INVENTION

The purpose of the present invention is to provide a very reliable flow meter and/or switch that is very sensitive to fluid flow to provide accurate measurements at particularly low flow rates.

The system pertains to flow control switches, or flow meter switches that are very sensitive in which fluid flow (liquid, gas or vapor in a container, pipe, duct, etc.) impinges on a shaped flexible flow sensing bending beam target, which is thereby bent such that a portion of the target is between a light source or optical emitter (LED) and photo detector or receiver (photo transistor) thus, blocking or transmitting an optical signal between the light source and photo detector. The presence or absence of the light source or beam, thus represents the presence or absence of a fluid flow rate above or below a selected value thus, performing a selective fluid flow switch function.

The system described and disclosed can also be used as a flow meter transducer that combines the motion of the flow responsive bending beam with a shaped blocking target to continuously modulate the percentage of relative light output of the light source and photo detector pair, which in turn produces an output voltage signal directly proportional to the rate of flow past the bending beam target. The combination of the functional elements constitute an analog fluid flow meter transducer, information source for flow monitoring systems.

The system employs a light source, or photo emitter (LED) and a photo detector or photo transistor receiver disc (PRD) with a light modulating target mounted on a fluid sensing bending beam in the path of a fluid flow. The light modulating target interrupts the light from the source to the photo transistor receiver disc. Preferably, the system can employ both opaque, transmissive or reflective type targets to modulate the transmission of light from the source to the photo transistor receiver.

In a first embodiment of the invention, the light modulating target is an opaque blade mounted on a flow sensing bending beam. The light blocking target may be rectangular or square. Deflection of the bending beam moves the blade to block the path of light from the source to the photo detector. The relative size of the light source and photo detector can be chosen to provide precise and repeatable very low flow rate measurements. For conditions where the fluid is cloudy or there is a build-up of contamination between the light source and photo detector, larger size PRDs will provide adequate low flow sensitivity at significantly greater power levels.

A wide variety of blocking targets can be used to control or measure the fluid flow. One target can be a straight edge rectangular of square target in combination with a very small diameter PRD to provide a flow switch application with precise repeatable very low flow rate measurement. Modulation of the light source and output from the photo detector can be provided by varying the size and shape of the blocking targets. Convex, concave, triangular and reflective type targets can modulate the output from the photo detector.

The modulated output of the photo detector can produce an analog flow meter output that is directly proportional to the rate of fluid flow past the bending beam target. Photo detector output is converted to analog flow meter outputs by metering the optical energy passing between the light source and the photo detector as a function of the degree of bend of the flow sensing blade.

Thus, three different methods are involved in this device. One is mechanical occultation, while the second is radiation absorption occultation and the third is selective reflection. Mechanical occultation is produced in transmission type flow meters by shaping the cross section of the blocking target. In this type of embodiment, the blade or blocking target, completely blocks a percentage of the light from reaching the photo detector.

The radiation absorption occultation is provided by a selective blocking target which selectively increases or decreases the amount of light from the light source that reaches the photo detector. This type of system employs a blocking target that has varying opacity. The blocking target varies from a crystal clear edge to completely opaque at the opposite edge. The variable transmission blade subjects the photo detector to variable levels of radiation as the light source gradually transits the blade from clear to opaque due to the bending of the flow sensing blade or vice versa; from clear to opaque.

Another mode that can be useful to improve flow sensitivity by as much as a factor of two or more, is by measuring an output produced by fluid flow vortex shedding. Vortex shedding is the successive variation in the flow pattern and dynamic drag on or downstream of an object subjected to fluid flow. A familiar manifestation of the phenomenon is the fluttering of a flag in the wind. The vortex shedding can be enhanced by adding appendages to the outer lateral sides of the flow sensing bending beam.

Processing electronics provide three areas of fluid flow transducer information via the flow sensing beam in conjunction with the various photo detector systems. These three areas are flow switch activation for on/off flow control, fluid flow meter measurement to determine the rate of flow, or a combination in which the flow meter provides a measurement of the total volume of flow as a function of elapsed time also included are single or multiple set points for on/off flow switch control. Total flow quantity measurement is also available.

The flow switch activation system provides an output to a step smoothing filter that is then fed to a voltage level comparator for amplification and transmission to a switch activating system such as a relay or a logic circuit. This system simply provides on/off (above or below) flow set point information.

The fluid flow meter measurement transducer system provides a variable output to a smoothing filter for amplification and processing by a signal processor to provide an analog output to a downstream electrical system that analyzes the output to determine the rate of flow and/or, the total volume of flow.

The system for combined flow meter measurement and flow switching information provides an electrical output from a variable light detection to a smoothing filter for amplification and signal processing. The signal processor also provides an output to a set point comparator that can set single or multiple flow set points. The output of the signal processor is then fed to downstream electronics that can provide switch processing for single or multiple flow set points.

The above and other novel features of the invention will be more fully understood from the following detailed description and the accompanying drawings, in which:

BRIEF DESCRIPTION OF THE DRAWINGS

FIGS. 3a through 3d illustrate a variation of the photo detector bending beam fluid flow switch of FIG. 1.

FIGS. 4a and 4b illustrate another embodiment of a photo detector fluid flow switch using a reflective surface.

FIGS. 5a and 5b illustrate another variation of the reflective photo detector flow switch of FIGS. 4a and 4b.

DETAILED DESCRIPTION OF THE INVENTION

Figure 1:
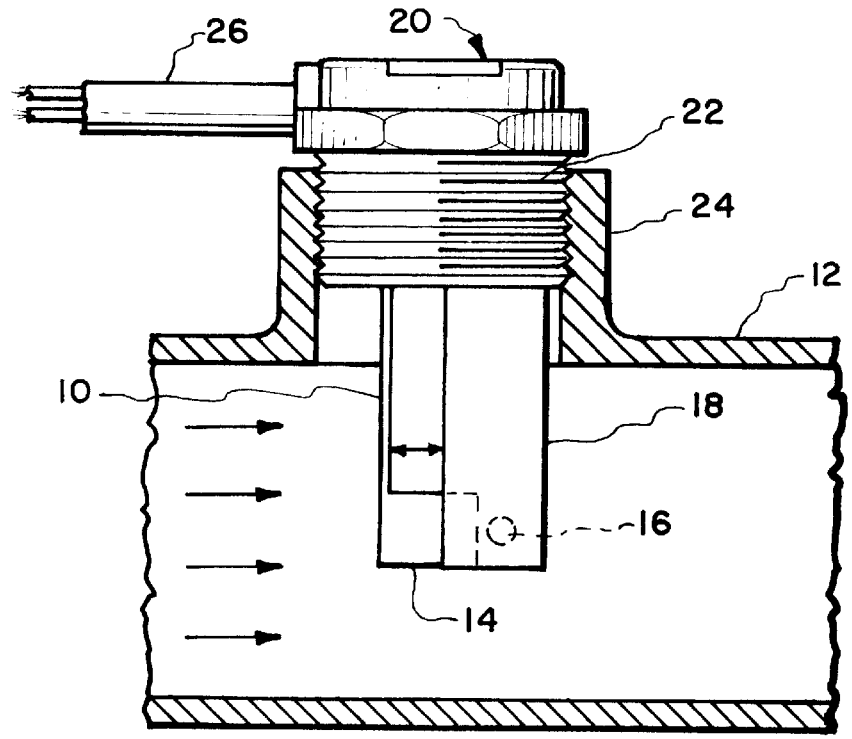
FIG. 1 is diagram of a bending beam flow switch having a light source and photo detector positioned in a fluid conduit.
Figure 1A:
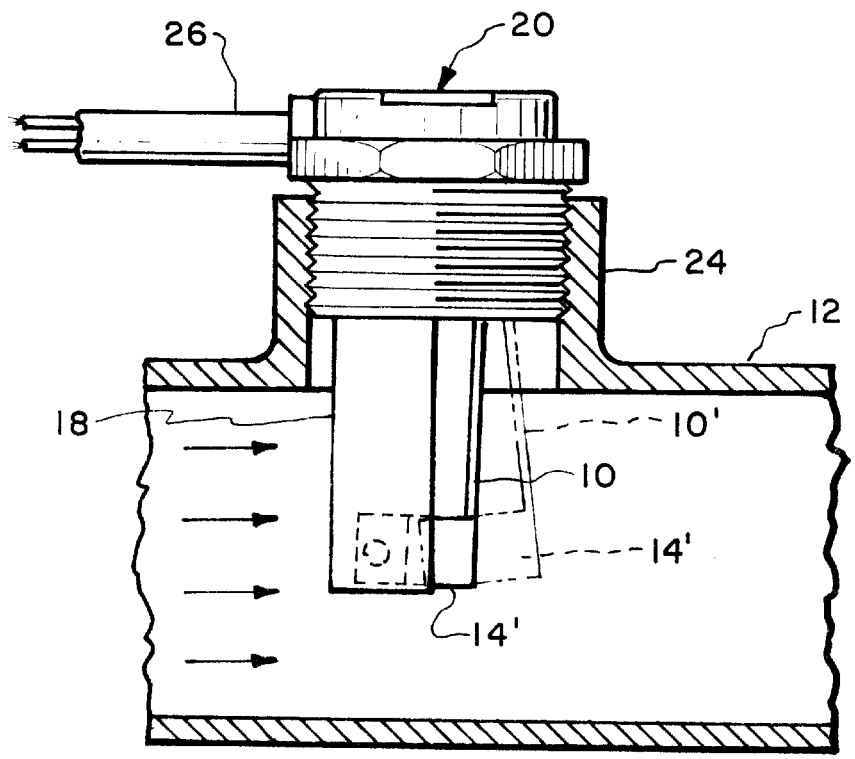
FIG. 1(a) is a partial sectional elevation of a fluid flow sensing switch similar to FIG. 1 with the operation of the bending beam reversed.

An improved flow detecting switch, or flow meter is generally illustrated in FIG. 1. The reverse operation of the system is illustrated in FIG. 1a in which the bending beam moves away from the detector. Thus, FIGS. 1 and 1a illustrate both bending beam flow induced portions. The following description applies equally, but in reverse to the operation of the system illustrated in FIG. 1a. A very sensitive flow detecting switch can be provided by mounting a flow sensing bending beam 10 in a conduit 12 having a blocking target 14 that will block the transmission of light from emitter 16, passing to a photo detector or photo transistor receiver 28 (FIG. 2a) opposite emitter 16. A fluid flows through duct or pipe 12 as indicated by the arrows, and will deflect bending beam 10 as shown by the curve so that blocking target 14 blocks emissions from source 16 to photo detector 28. Emitter 16 and photo detector 28 are mounted on a housing 18, attached to a cap 20 having thread 22 for mounting the emitter in tee 24. Output is provided through electrical cable 26.

Figure 2A:
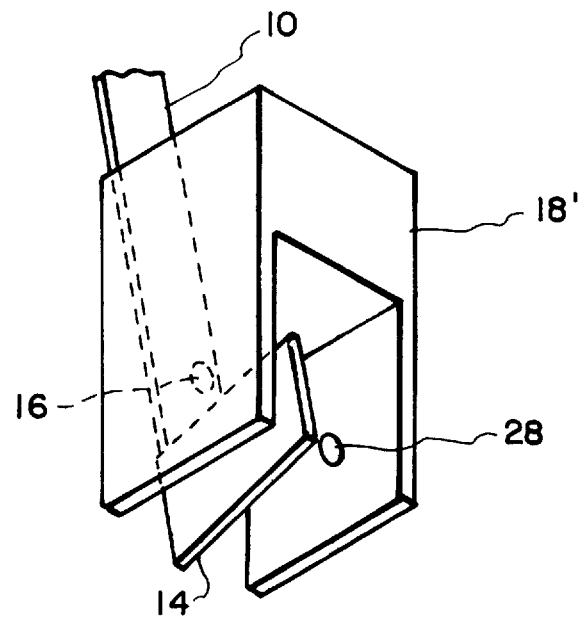
FIGS. 2a and 2b are diagrams illustrating the operation of the photo detecting fluid flow switch of FIG. 1.
Figure 2B:
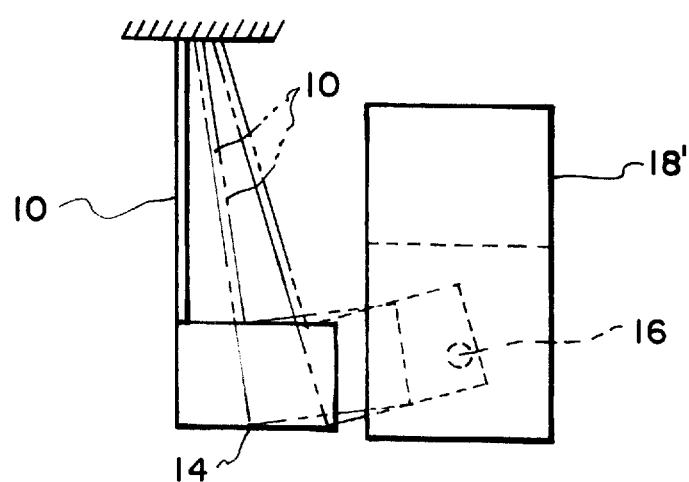

The operation of the photo detecting flow switch is illustrated in FIGS. 2a and 2b. This figure illustrates the deflection of bending beam 10 so that blocking target 14 interrupts light from source 16 to photo detector 28. As can be seen in FIG. 2b, beam 10 is deflected by the flow of fluid through pipe 12 so that target 14 interrupts the light from source 16 to photo detector 28.

As in the device disclosed and described in applicant's prior U.S. Pat. No. 5,021,619, incorporated herein by reference, the adjustment of the size and stiffness of the bending beam 10 determines a triggering flow rate. Further, various configurations of the blocking or interrupting target 14 can be provided to provide a very sensitive and accurate flow switch or flow metering device.

One such modification of the blocking target is illustrated in FIGS. 3a through 3d. In this embodiment, photo emitter 16, which preferably can be a light emitting device (LED) and a photo detector 28 are mounted in housing 18 as before. However, blocking target 14, on bending beam 10, has a length that keeps photo detector 28 in a normally non-conductive state (i.e., a closed window). Light emitted from light source 16 (LED) is blocked from transmission to photo detector or photo transistor receiver disc 28 (PRD). When fluid flows in conduit 12 and impinging on and deflecting beam 10, aperture 15 in blocking target 14 will be aligned with emitter 16 and detector 28, changing the state of detector 28 to conducting. This will provide the condition of being off with no flow, and on or open when there is flow in conduit 12. When there is no flow there is no output from photo detector 28. When there is flow sufficient to bend beam 10 and align aperture 15 with emitter 16 and photo detector 28 as shown in FIGS. 3c and 3d, an on condition is provided with photo detector 28 becoming conductive and providing an output.

Similar functions can be provided by reflective targets as shown in FIGS. 4a, 4b, 5a and 5b. In these embodiments, a target 30 has a reflective surface 32. An emitter 34 and photo detector 36 are mounted on a housing in a manner similar to that previously described. The operation of this device is illustrated in FIG. 4b. Beam 10' is impinged upon and deflected by the flow of fluid in conduit 12 moving target 30 so that reflective surface 32 intercepts light 40, indicated by the dotted line, from emitter 34 into photo detector 36. Thus, photo detector 36 will remain non-conducting until reflective surface 32 deflects emissions 40 from photo emitter or LED 34 into photo detector 36. This arrangement will provide a normally non-conductive closed window, or off condition when there is no flow, and will change state to an on condition when bending beam 10' is deflected to reflect light from surface 32 into photo detector 36.

A variation of the embodiment of FIGS. 4a and 4b is illustrated in FIGS. 5a and 5b. In this embodiment, a bending beam 10' has a target 30' with a reflective surface 32' as before, except that it has aperture 31 that is in registration with emissions 40 from LED 34. When there is no flow, and bending beam 10' is at rest, emissions 40 will pass through aperture 31 uninterrupted. When bending beam 10' is deflected by flow through conduit 12, aperture 31 will be displaced causing emissions 40 to be reflected off reflective surface 32' causing photo transistor receiver or photo detector 36 to conduct. This operation can be reversed by having reflective surface in alignment with emissions 40 so that deflection of bending beam 10' causes aperture 31 to come into alignment with emissions 40.

Figure 6:
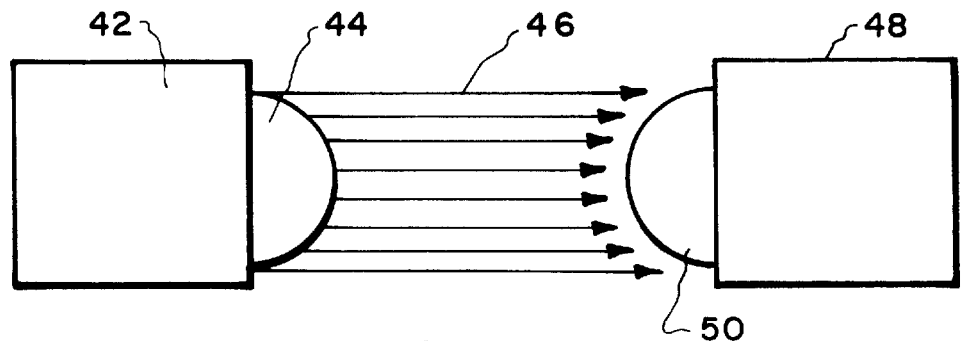
FIG. 6 is a diagram of a light source or optical emitter and a photo detector or photo transistor receiver designed and that may be employed in the invention.

Thus, the system can employ both transmission and reflective type target for modulating the transmission of radiation from photo emitter or LED 34 to photo transistor receiver or photo detector 36. Preferably, both photo emitter 34 (LED) and photo transistor receiver disc 36 (PRD) are circular in cross section so that when they are mounted in housing 18 or 18' in close proximity, the radiation flux can be considered approximately uniform across the circular face of the photo transistor as illustrated in FIG. 6. The photo emitter or light emitting diode 42 has a optical disc 44 from which emissions 46 are transmitted to photo transistor receiver 48, having a receiver optical disc face 50. Thus, radiation or emissions 46, received by photo transistor receiver 48, are approximately uniform across optical disc 50.

As in the direct transmission of light from the photo emitter to the photo detector, diffused radiation transmitted in the reflective type transceiver assemblies is also approximately uniform across the circular face of the receiver disc. However, radiation transmission from a source such as an LED to the photo detector does not have to be perpendicular or uniform for normal operation of transmission type or reflective type photo micro sensors that operate in the infrared optical wavelength. Such photo micro sensor or photo detectors, operating at infrared optical wavelengths at peak wave lengths of 930 mm and 880 mm can be used to increase penetration and transmission through dirt, oils, scums and other contaminant build-up in fluids and on surfaces which could reduce the performance of a photo detecting device. The devices disclosed here preferably use infrared photo detectors to provide maximum performance, however, the device are not restricted to the infrared band, but can be used at all optical bands from ultraviolet to far infrared as required in each particular environment and geometry.

Figure 7:
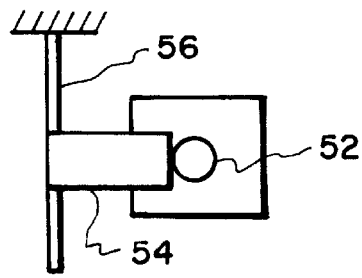
FIGS. 7, 8a and 8b illustrate the operation of a straight edged blocking target for the photo detecting fluid flow switch according to the invention.
Figure 8A:
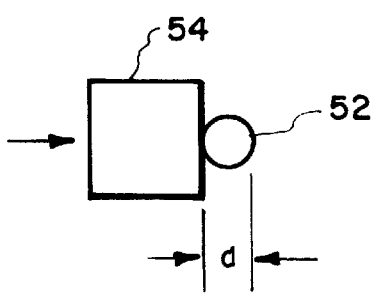
Figure 8B:
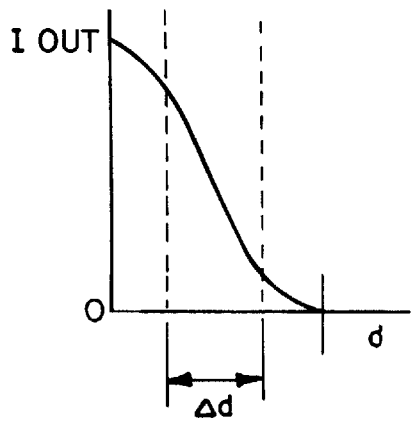

Various size and shape blocking targets can be attached to flow sensing bending beam 10 to provide a controlled output from the photo detecting device. FIGS. 7, 8a and 8b illustrate a straight edge blocking target in combination with a small diameter emitter (not shown) and photo detector or photo transistor receiver disc (PRD). FIGS. 8a and 8b illustrate the output of a PRD 52 (FIG. 7) when light is blocked by blocking target 54 on bending beam 56. The relationship of the output of PRD 52 in relationship to the distance "d" shown in FIG. 8a is illustrated in the graph of FIG. 8b. The percentage of relative like transmission (Ad) is in a medium range.

Flow, indicated by the arrow adjacent target 54, impinges deflects bending beam 56 to block emissions from PRD 52 providing output shown in the graph of FIG. 8b. This percentage relative light transmission is for a straight edge blocking target 54.

Figure 9A:
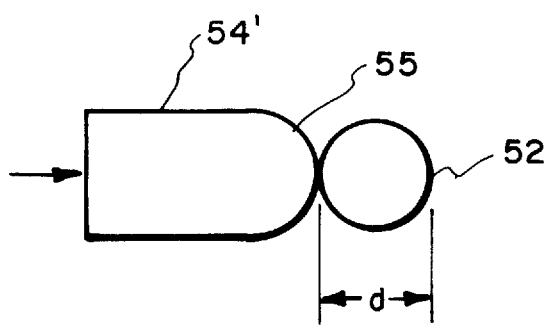
FIGS. 9a and 9b illustrate the construction and operation of a photo detecting fluid flow switch having a convex edge blocking target.
Figure 9B:
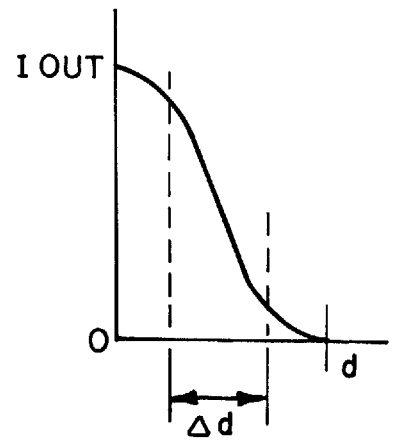

The output for a convex edge blocking target is illustrated in FIGS. 9a and 9b. Flow is again indicated by the arrow deflecting blocking target 54', having convex edge 55 to block emissions from PRD 52. The percentage relative light output is illustrated in the graph of 9b. This type of convex edge blocking target will provide a relatively wide output (Ad).

Figure 10A:
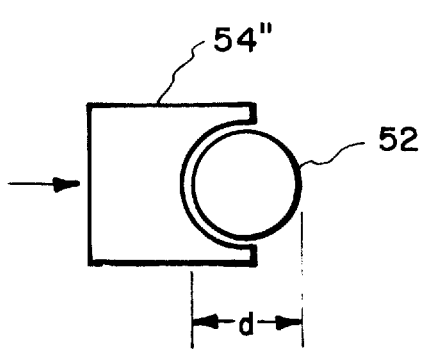
FIGS. 10a and 10b illustrate a photo detecting fluid flow switch having a concave edge blocking target.
Figure 10B:
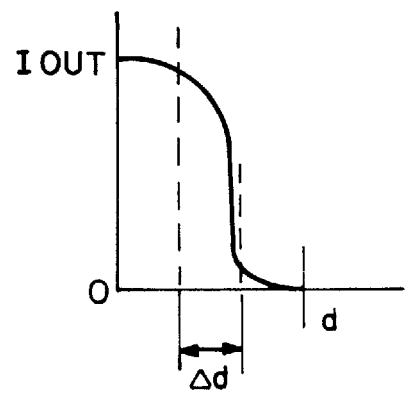
Figures 11A, 11B, 11C, 11D:
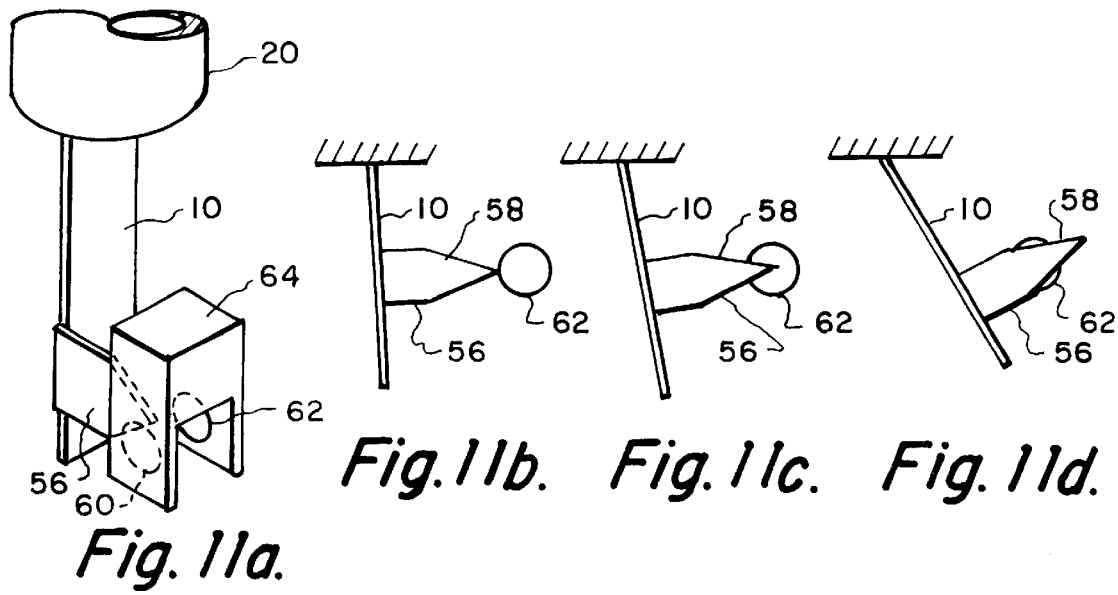
FIGS. 11a through 11d illustrate a selective male shaped mechanical blocking target used in the invention.

A concave blocking target 54" is illustrated in FIGS. 10a and 10b. In this embodiment, blocking target 54", is deflected by fluid flowing in the direction of the arrow, blocks emissions from PRD 52, having a relatively small diameter D in the range of 0.050 to 0.060 inches. For the concave edge blocking target of FIGS. 10a and 10b, the percentage relative light output would be narrow (Ad) as shown in the graph of FIG. 10b.

The relative straight edge, concave and convex shapes of the embodiments of FIGS. 7, 8(a), 9a and 10a illustrate the modification of the light output curve (I) as a function of the shape and size of blocking targets 54, 54' and 54" as they are moved across the face of PRD 52. The combination of a small size photo transistor receiver, in the range of 0.05 to 0.06 inches, and shaped blocking target, can provide flow switch applications that are precise and repeatable for very low flow rate requirements. Photo detector (PRD) devices in the diameter range of 0.2 to 0.5 overall diameter may also be used. This size PRD provides a reduced, but adequate flow sensitivity and will do so at significantly increased power levels; up to ten times the operating power of the small diameter units. These can be used for greater transmission through cloudy flow media plus in devices where a build-up of contamination on the transmission and receiving windows can occur.

The system can also use photo detecting technology, as previously described, to produce analog flow meter devices which transmit continuous analog flow rate information as a function of time in addition to digital type flow switch information. Photo detectors, or photo micro sensor units can be converted to analog flow meter outputs by metering the optical energy passing between the light or LED source and the photo transistor receiver or photo detector as a function of the degree of bend of the flow sensing blade. Thus, two methods are involved in the invention disclosed herein. One is mechanical occultation and a second is radiation absorption occultation.

Selective, mechanical occultation can be produced in transmission type flow meters by shaping the cross section of the blocking target as illustrated in FIGS. 11a through 11d and 12a through 12d. In FIGS. 11a through 11d, a blocking target 56, having a male sharply pointed convex surface 58, mounted on bending beam 10 is provided. Photo emitter 60 and photo detector 62 are mounted in a housing 64 as before. As bending beam 10 is deflected by the flow of fluid in conduit 12, pointed or triangular shaped end 58 of blocking target 50 gradually decreases the output from photo detector 62.

Figures 12A, 12B, 12C, 12D:
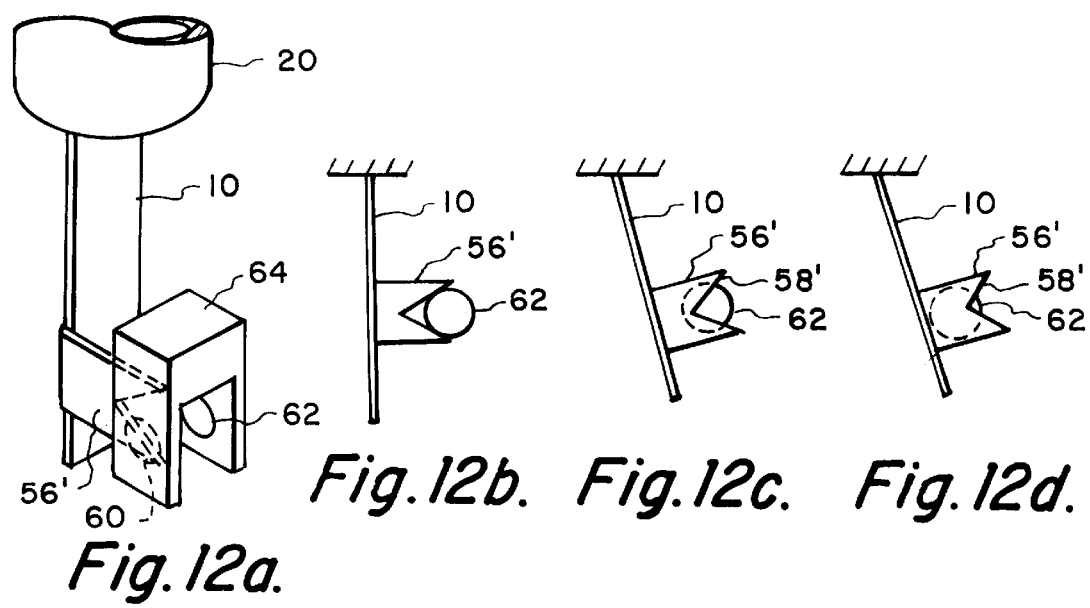
FIGS. 12a through 12d illustrate a photo detecting fluid flow switch using a selective female shaped mechanical blocking target.
Figure 13:
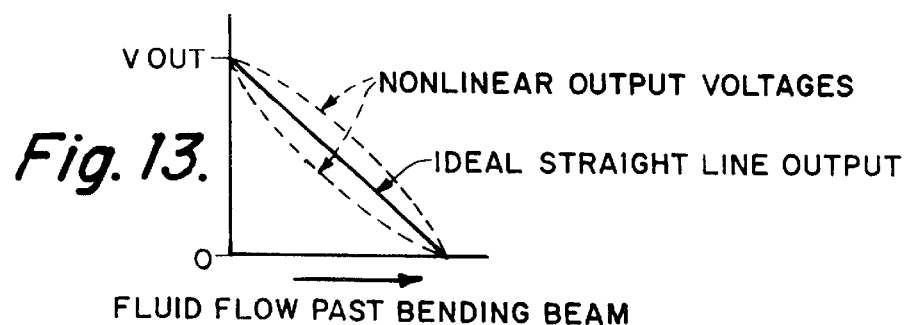
FIG. 13 is a graph illustrating the output voltage of the photo detector relative to the fluid flow past the bending beam according to the invention.

A similar arrangement is illustrated in FIGS. 12a through 12d with the exception of blocking target 56' having a female V-shaped notch front end 58'. As bending beam 10 is deflected by the flow of fluid through conduit 10, it gradually blocks the transmission from emitter 60 to photo detector 62 as illustrated in FIGS. 12b through 12d. Each of these devices provide selectively controlled output as illustrated by the graph of FIG. 13. The straight line indicates an ideal straight line output. The dotted lines indicate non-linear output voltages from the shaped blocking targets of FIGS. 11a through 11d and FIGS. 12a through 12d.

Figure 14A:
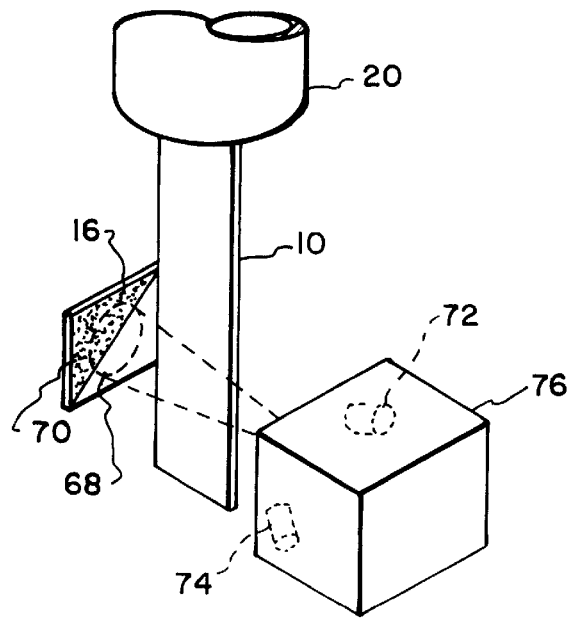
FIGS. 14a and 14b are diagrams of a photo detecting fluid flow switch having partially reflective surfaces on the blocking target.
Figure 14B:
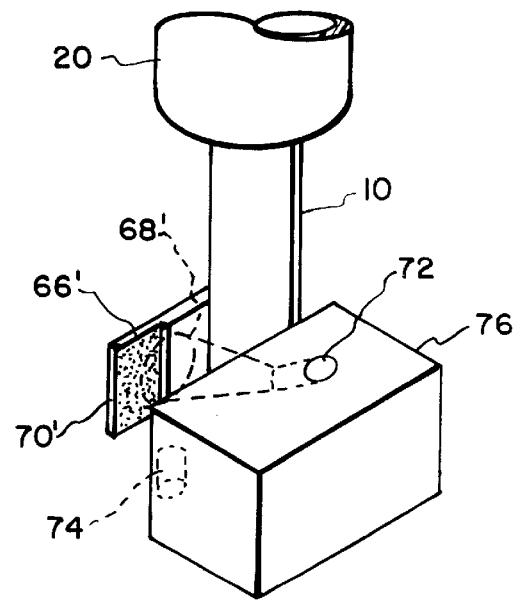
Figure 15:
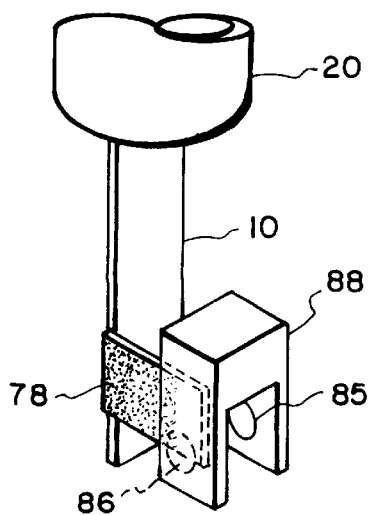
FIG. 15 illustrates a photo detecting fluid flow switch having selective radiation absorption.

Variations in reflective targets can also be provided as shown in FIGS. 14a and 14b. In these embodiments, blocking target 66, having triangular shaped reflecting surface 68 and non-reflective surface 70, are provided. Photo emitter 2 and photo detector 74 are mounted in housing 76 at right angles to bending beam 10. A fluid flowing in conduit 12 will deflect bending beam 10 causing selective portions of emissions from emitter 72 to be reflected into photo detector 74.

In FIG. 14b, blocking target 66' is provided with a rectangular or square reflective surface 68' and non-reflecting surface 70'. Deflection of bending beam 10 reflects light from emitter 72 into photo detector 74 as before. In each of the embodiments in FIGS. 14a and 14b, reflective surfaces 68 and 68' can be varied in size and shape in any manner desired. The shape and size illustrated in these figures is approximately one-half the area of the blocking target 66 and 66'. However, it does not have to be any selected portion of the blocking target. The amount of reflective surface would depend upon the particular application and the output from photo detector 74 desired.

The male and female shaped mechanical occulting targets of FIGS. 11a through 11d and 12a through 12d are idealized. However, their actual shapes are experimentally determined to provide close approximation to the ideal straight line output curve as illustrated in FIG. 13.

The reflective type devices illustrated in FIGS. 14a and 14b are designed to provide analog flow meter output information as a function of time, as shown in the Figures. The electrical output is a function of the percentage of common radiation pattern reflected from the transmitter to the reflector, which is shaped to optimize a linear output relationship between flow input and voltage output. Final voltage output linearization is accomplished via the electrical circuits and a microprocessor.

Figure 16:
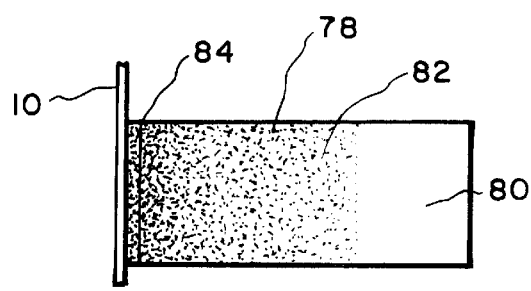
FIG. 16 is a diagram of a selective radiation adsorptive blocking target for use in the embodiment of FIG. 15.

Another embodiment of the invention provides selective radiation absorption to produce a variable analog flow meter output, as illustrated in FIGS. 15, 16 and 17a through 17c. In this embodiment, blocking target 78, having variable opacity to provide variable transmission, is very clear at a leading edge to substantially opaque at the edge connected to bending beam 10. A variably opaque blocking target 78 is shown in FIG. 16, having a substantially clear area 80 that initially intercepts a light emission and gradually increases in opacity at 82 to being completely opaque 84 at the end connected to bending beam 10.

Figure 17A:
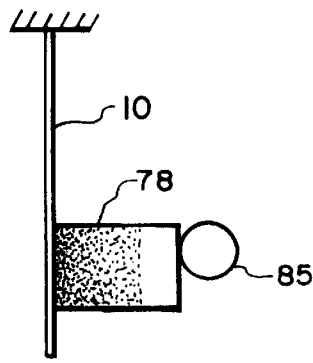
FIGS. 17a through 17c illustrate the operation of the selective radiation absorption blocking targets from clear to partially adsorptive, to completely opaque.
Figure 17B:
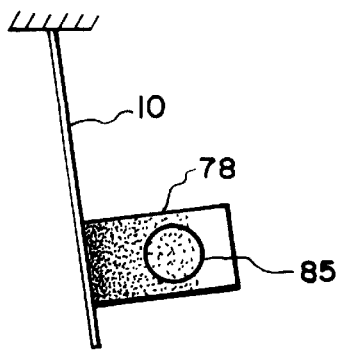
Figure 17C:
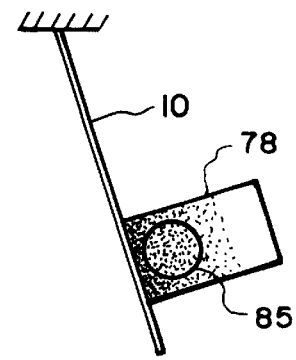

The variable transmission of the variable opacity blocking target 78 is illustrated in FIGS. 17a through 17c. As bending beam 10 is deflected by fluid flowing in conduit 12, variable transmission blocking target 78 gradually reduces the amount of emissions reaching photo detector 85 from photo emitter 86, both of which are mounted in housing 88. As is shown in FIGS. 18a and 18b, the radiation transmitted from the LED photo emitter 86 through variable transmission window of blocking target 78 to photo detector 85 is subjected to variable levels of light absorption as the emissions from photo emitter 86 travel the length of blocking target 78 from clear end 80 to opaque end 84 due to bending of beam 10.

Figure 18A:
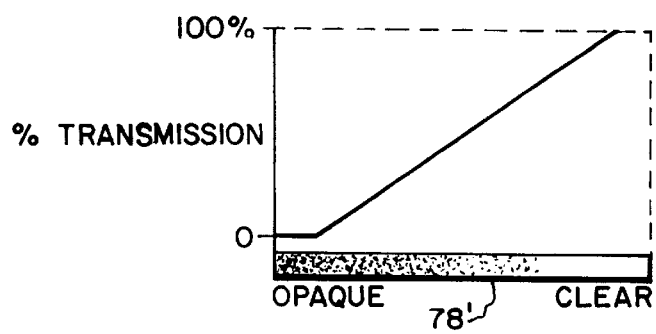
FIGS. 18a and 18b are graphs illustrating the percent transmission and voltage output relative to the selective absorption of the selective blocking target.
Figure 18B:
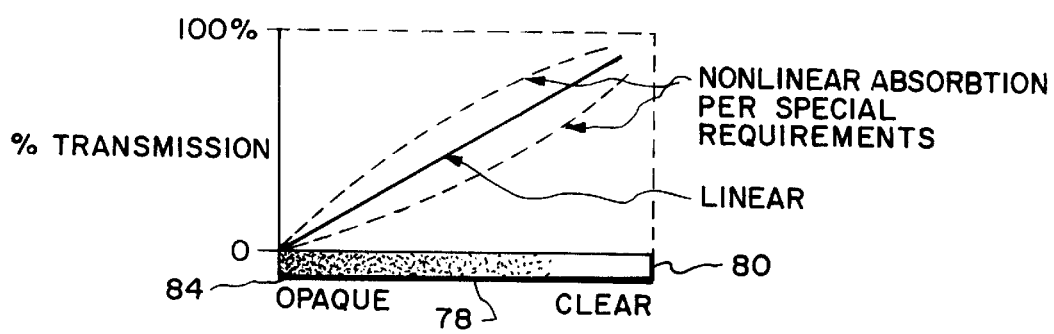

In FIGS. 18a and 18b, blocking target 78 is represented edge wise from clear to opaque. The percentage transmission relative to the output voltage of photo detector 85 is illustrated in FIG. 18b. The non-linear absorption, for special requirements, versus the linear absorption from 100% at the clear end 80 to the opaque end 84, is illustrated in FIG. 18b.

FIGS. 15, 16, 17 and 18 above illustrate initial flow sensing blade 10 providing zero absorption at initial no flow condition to maximum absorption at high flow condition. The same absorption technique could be reversed (i.e., opaque to clear for no flow to maximum flow variation to reverse the output signal from high to low, or low to high as required for each particular application). The operating absorption band can also be adjusted between any intermediate band width limits between clear, partial absorption and full absorption (i.e., clear to partial absorption, partial absorption to increased absorption, etc.).

The variable transmission of emitter light from photo emitter or LED 86 completes the transducer action of transforming the variable fluid flow information in conduit 12 to variable analog optical absorption and thus, to variable analog voltage information suitable for processing via analog to digital (A/D) conversion, voltage current conversion or micro processing manipulation to the final overall conversion of analog fluid flow rate meter input information to electronic analog fluid flow rate meter output information.

Figure 19:
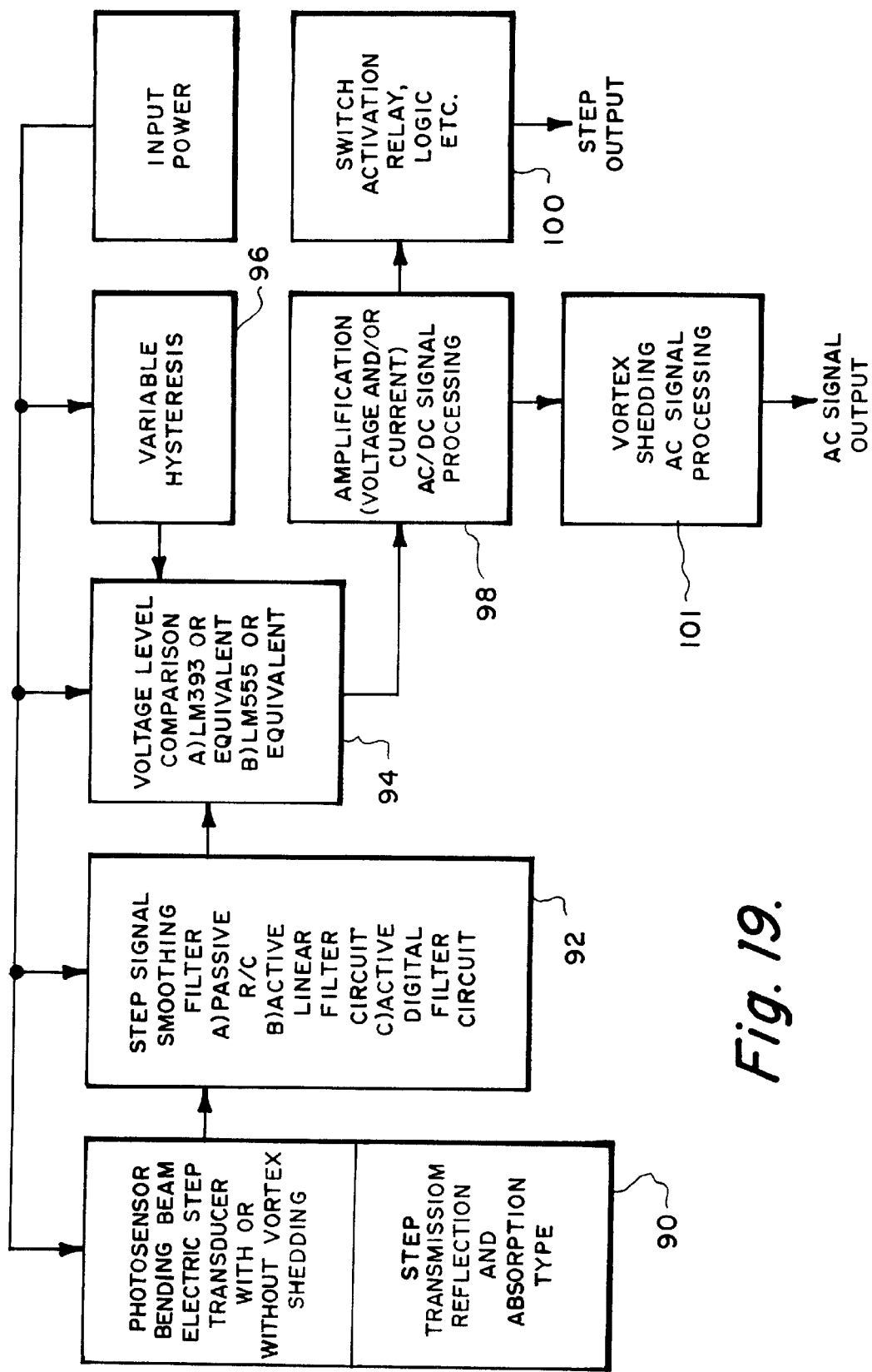
FIG. 19 is a schematic block diagram of a system for use as a fluid flow switch activation system.
Figure 20:
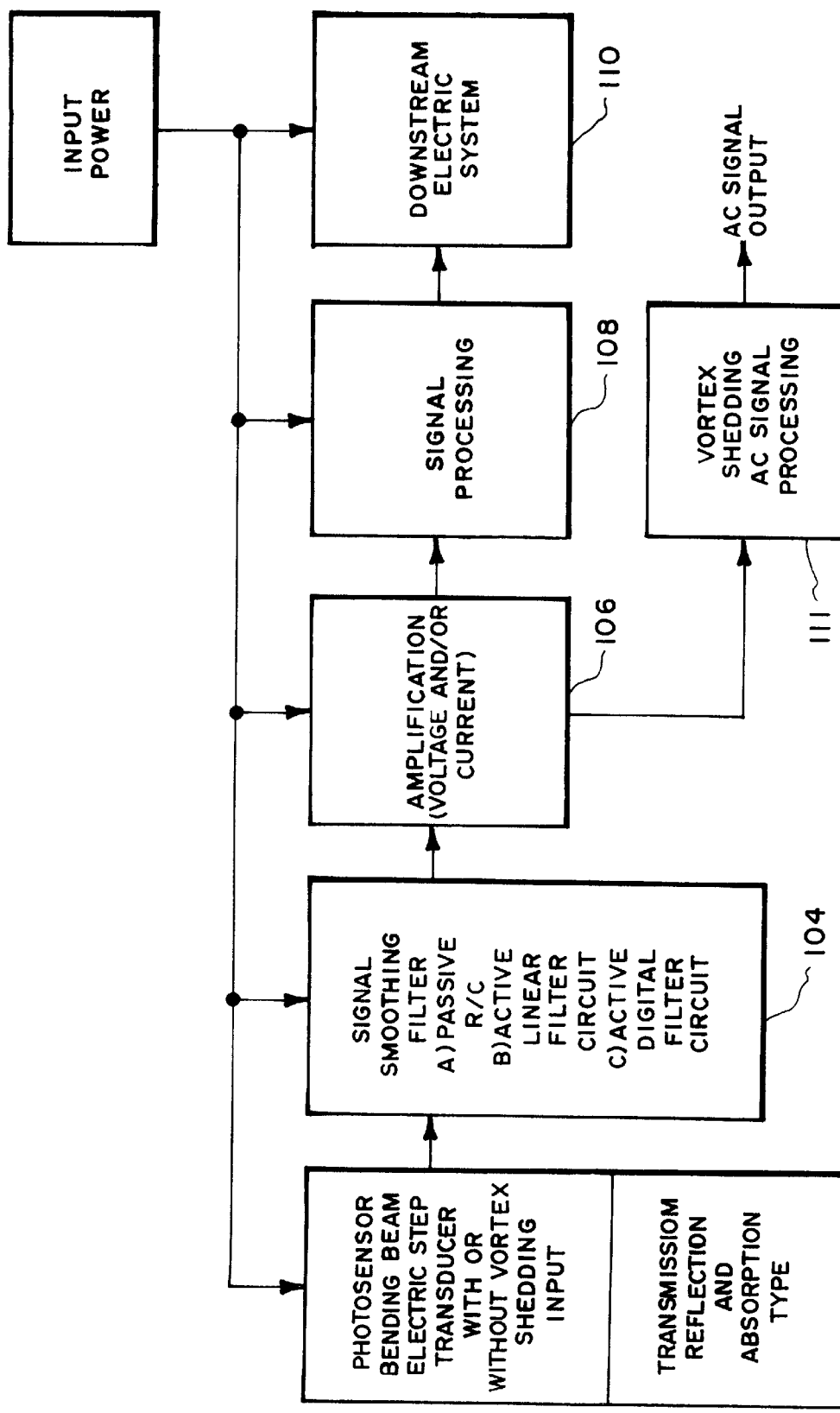
FIG. 20 is a schematic block diagram illustrating a system used as a fluid flow metering transducer system.
Figure 21:
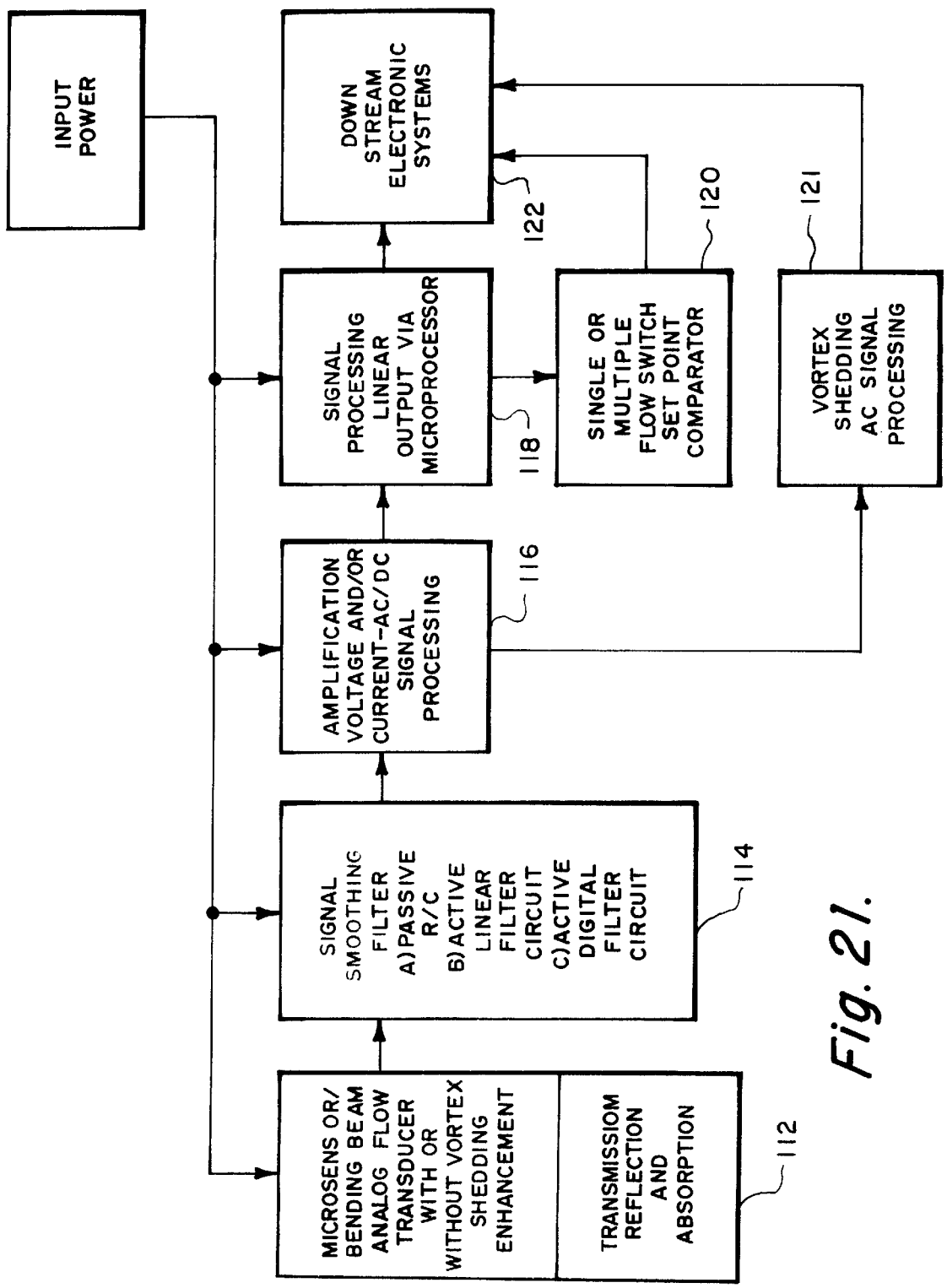
FIG. 21 is a schematic block diagram illustrating the system used both as a fluid flow measuring system as well as a single or multiple set point flow switch.

The output from the photo detectors or photo transistor receivers can be processed as shown in the schematic block diagram of FIGS. 19, 20 and 21. The systems disclosed can cover three areas of fluid flow transfer information processing via the flow sensitive bending beam 10 in conjunction with the various photo micro-sensors or photodetectors as detailed above, and schematically shown in these figures. The systems disclosed thus, transfer the flow of a fluid, gas or vapor flowing past a flow sensing flexible blade via a photo detector transducer system into a continuous analog voltage, which is electronically processed to provide flow meter, flow totalizer and/or flow switch output information in any sequence or combination as required.

The electro-optical flow meter and flow switch described above is a new device developed in a continuing quest for increased fluid flow sensitivity based on the integrated combination of a bending beam/shaped flow target such as that described in U.S. Pat. No. 5,021,619 issued Jun. 4, 1991 to the same inventor as the invention shown herein. The flow sensitivity of the extremely narrow optical/mechanical hysteresis dead band (approximately 0.001 inch to 0.002 inches) described above can be further increased by a factor of approximately (2) or more by using a bending beam flow target fitted with a vortex shedding enhancing configuration, plus operating the flow transducer in a flow meter mode.

Figure 22:
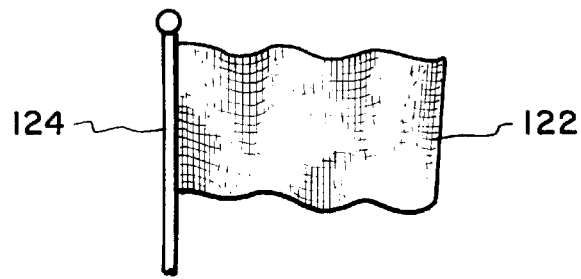
FIG. 22 is a side view of a fluttering flag to illustrate the vortex shedding phenomenon.
Figure 23:
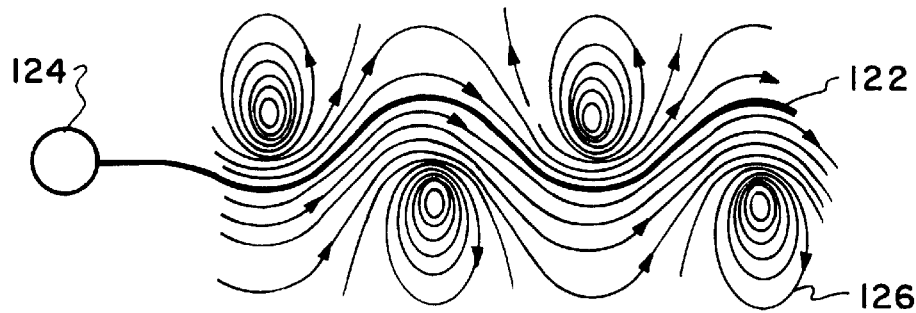
FIG. 23 is a top view of the fluttering flag of FIG. 22 illustrating the path of the flow of air creating vortex shedding.
Figure 24:
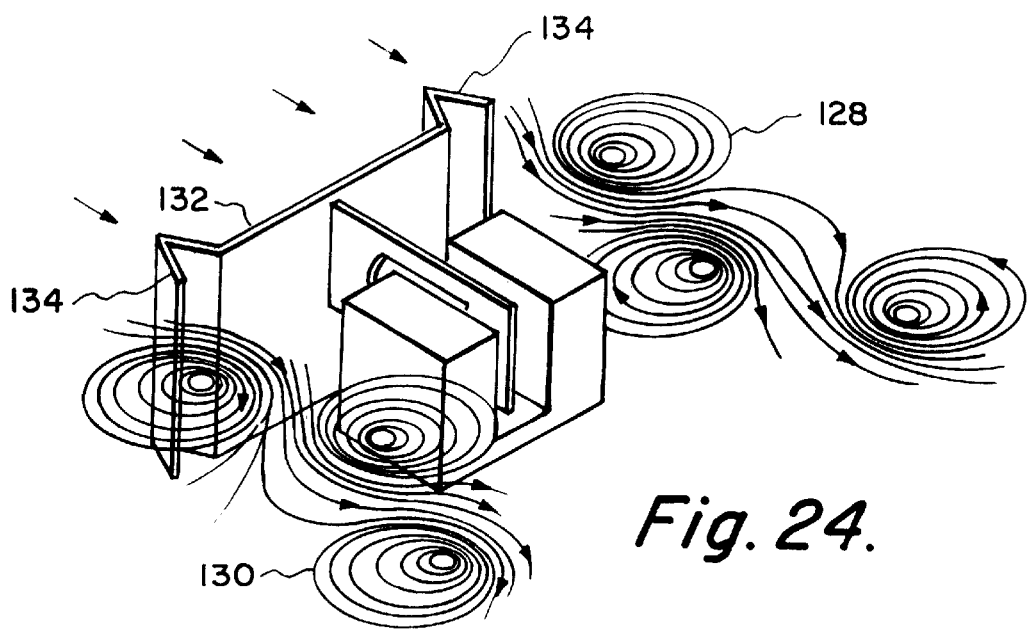
FIG. 24 illustrates a modification of the bending beam to enhance vortex shedding.

Vortex shedding is best illustrated in the classic "flag flutter phenomenon" illustrated in FIGS. 22 and 23. Flag 122, on flag pole 124, flutters according to the flow of fluid or air over its surface, as shown in FIG. 23 (fluid dynamic drag, Dr. S. F. Hoerner, 1965, pp. 3–25, Library of Congress Catalog No. 64-19666). Vortex shedding, indicated by swirling arrows 126, is caused by a flow of air over the surface of flag pole 124 and flag 122. This vortex shedding can be put to use in the flow meter of the present invention.

FIGS. 24 through 27 illustrate the general features of a modification to flow sensitive bending beam transducer system to enhance and use vortex shedding to increase flow sensitivity and measure low flows. The alternating series of downstream vortexes 128 and 130 (FIG. 24) produce alternating pressures on either side of bending beam 132 which finally appears as a fluid flow induced longitudinal oscillation of bending beam 132 along the axis of the primary fluid flow vector. In the embodiment of FIGS. 24 through 27, bending beam 132 has appendages 134 in the form of flanges having a V-shaped cross section along the lateral or lengthwise edge of bending beam 132. Appendages 134 disrupt the flow of fluid over the surface of bending beam creating enhanced vortex shedding 128 along either side of the bending beam.

Figure 25:
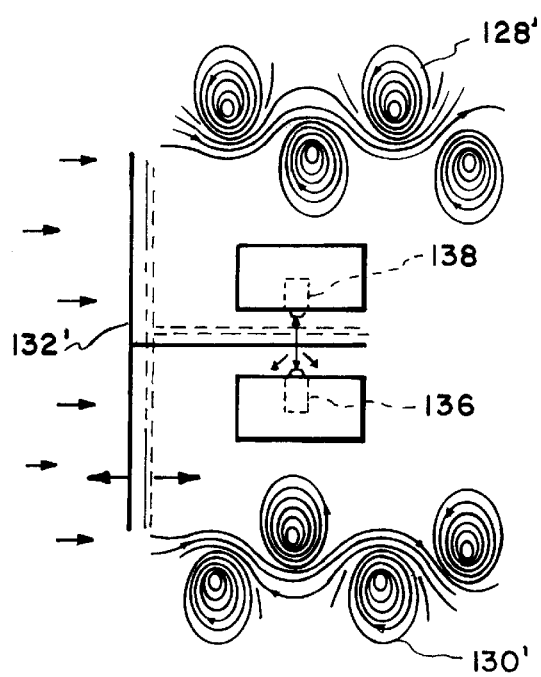
FIG. 25 illustrates vortex shedding caused by a flat plate bending beam.
Figure 26:
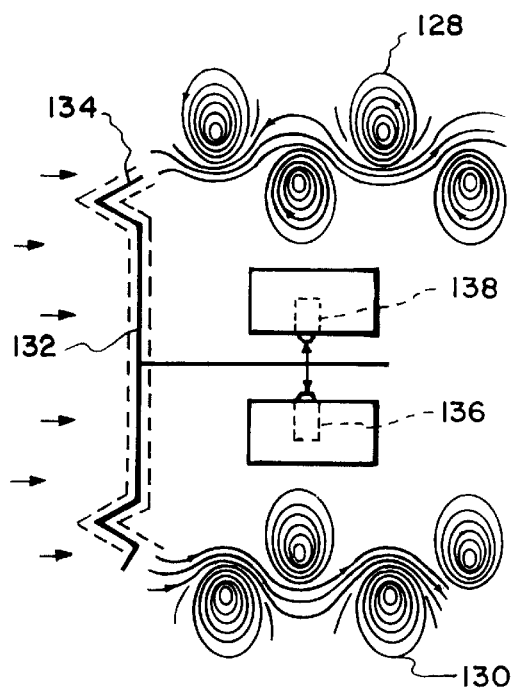
FIG. 26 is a top schematic view of the bending beam according to the invention, having specially shaped appendages along the edges to enhance vortex shedding.
Figure 27:
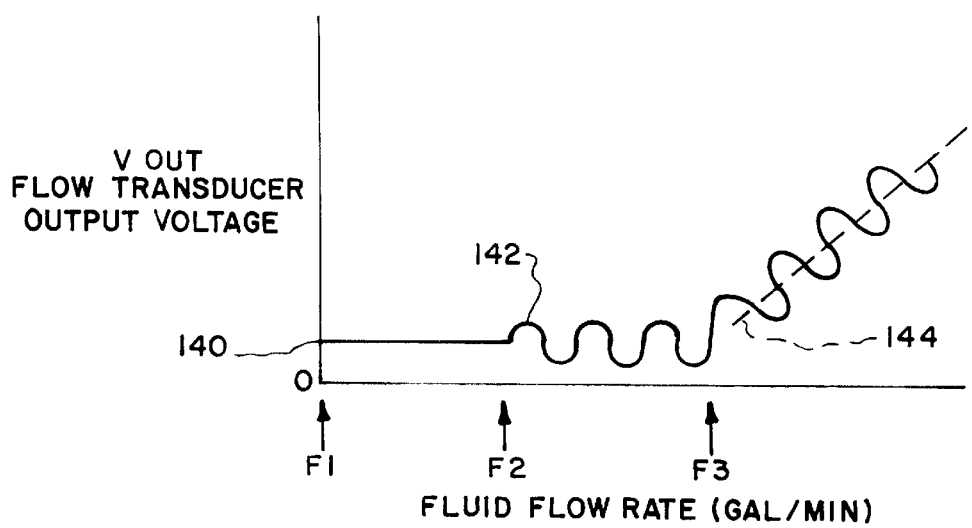
FIG. 27 illustrates the voltage output representing the various stages of flow from no flow to flow producing vortex shedding vibrational output, to a substantial flow producing an enhanced analog output.

The turbulence caused by appendages 134 increase vortex shedding from normal turbulence caused by bending beam of the embodiment of FIG. 1, as shown in FIG. 25 and 26. In FIG. 25, bending beam 132', without any enhancing appendages, will vibrate slightly causing some vortex shedding 128' and 130'. In FIG. 26, lateral V-shaped flanges or appendages 134, on bending beam 132, enhance vortex shedding 128, which can be detected and used to increase the sensitivity and measure low flow. Bending beam 132 will vibrate or oscillate as indicated by the dotted lines, providing vortex shedding 128 that will provide an output as illustrated in FIG. 27 before it begins a steady state bend.

Alternating series of vortexes 128 and 130 produce alternating pressures on either side in bending beam 132, which in turn induce alternating changes in the drag coefficient of the bending beam, which finally appear as a fluid flow induced longitudinal oscillation of the bending beam along the access of the primary fluid flow vector, as illustrated by the dotted lines. As discussed above and illustrated in FIGS. 25 through 27, the configuration of bending beam 132 modulates light from light source 136 falling on photo transistor 138 which in turn, oscillates the electrical voltage output of the flow transducer system. The amplitude of vibrating bending beam 132 is rather small, however, it produces a measurable alternating electrical input signal which can be amplified to any reasonable level (e.g., 500 mV AC or more). The AC output signal will be zero (0) for a no flow condition indicated at 140 for a zero (0) flow input bias voltage. Very low initial flow of fluid causes vortex shedding 128 and 130 from appendages 134 to vibrate bending beam 132, which will produce a small low frequency output indicated by minimum detectable vortex shedding AC output ($F_2$) at 142 (e.g., less than about 10 Hz AC output signal which can be amplified as required).

The result of the configuration shown in FIG. 26 is to detect a very low flow of fluid on the order of about 0.1 foot per second (Ft/Sec) past bending beam target 132 by looking for induced minute beam oscillations rather than steady state bending of the beam. This approach is equivalent to the human ear detecting minute acoustic sound pressure vibrations rather than steady state pressure variations. The transition of the output ($V_{out}$) from photodetector 138, from a fixed zero (0) flow ($S_1$) initial condition to a low flow condition (e.g., equal to about 0.1 Ft/Sec). Small vortex shedding induced vibrations on bending beam 132, which produce small variations in the light falling on photodetector 138, which finally produces a variable electrical AC output signal. As fluid flow input increases past ($F_2$) to a higher flow rate at ($F_3$) a measurable transducer DC component is added to the AC shedding voltage indicated at 144.

Subsequent electronic processing produces two useful flow transducer outputs: 1) An AC vortex shedding induced voltage which is a positive proportional frequency related to the fluid flow rate; and 2) A DC voltage proportional to the bending of flow detecting bending beam 132. Either flow detecting mode, or both modes, can be used simultaneously as required in each particular measurement. At the low flow region, between $F_2$ and $F_3$, the AC vibrating mode will predominate as an initial on/off flow switch detection, but may not provide useful flow meter output until the flow rate at $F_3$ is obtained. The minimum detectable photo transistor analog output, just after the flow rate reaches $F_3$ indicated at 144, at this point will be an AC voltage with a DC component indicated by the dotted line.

FIG. 19 illustrates the processing of the output of photo detector or photo transistor receiver to provide a flow switch control or a vortex shedding AC output for fluid flowing in conduit 12. Photo detector or transducer output 90 can be from any of the mechanical devices illustrated in the straight edge, shaped edge or reflection type. This output is fed to a smoothing filter 92 that can be a passive RC filter, and active linear filter circuit or an active digital filter circuit as desired.

The signal output is then smoothed and fed to a voltage level comparator 94 such as an LM393 or equivalent circuit. The signal smoothing filter 92 is an important element of the system because the system shown substantially eliminates the hysteresis of the system illustrated in prior U.S. Pat. No. 5,021,619. Flow measuring sensitivity is maximized which is a desirable operational parameter; however, this also increases the sensitivity of the system to flow turbulent noise. The low signal-to-noise ratio condition presented by the sensitivity to flow turbulence is corrected by including electronic signal smoothing filter 92 as part of the signal processing electronics. The output of smoothing filter 92 is then fed to voltage level comparator 94, which also receives a variable hysteresis feedback signal 96. Variable hysteresis 96 is a very small and repeatable electronic hysteresis introduced to ensure downstream electronic systems do not go into undamped electronic oscillations.

Voltage level comparator 94, compares the output from signal smoothing filter 92, with a reference voltage and produces a digital output when the input flow signal reaches or exceeds a reference level. The output is amplified by downstream amplifier 98 and then fed to output signal processor 100 for additional process and delivery to a flow control system.

The output from AC/DC signal processing amplifier is also output to signal processor 101 for processing the signal produced from vortex shedding. Vortex shedding signal processor 101 processes the AC component of the flow output representing very low flow. The mode can be used alone or with flow measurements. In a low flow conditioner, the AC signal output representing the vortex shedding AC signal will predominate as an initial of/off flow detection.

As previously stated, voltage level comparator 94 can be an LM393 or equivalent. Further, more sophisticated electronic filtering can be employed; such as digital notch filters, band pass filters, etc. to suppress acoustic, mechanical and electrical noise introduced in the system from outside sources.

The system can also be used as a low flow detector and flow meter with the electronics shown in FIG. 20. This system would use the output from the photo detector utilizing transmission reflection or absorption such as in the embodiments shown in FIGS. 14 through 18. In this system, fluid flow deflects beam 10, having either a reflective device as shown in the figures or a blocking target of varying opacity to provide an analog output from the photo detectors. The output (FIG. 20) from the photo detector is then smoothed by signal smoothing filter 104 for output to amplifier 106 that provides an output to signal processor 108. The signal processor can be a central processing unit or micro-processor that provides a linear output to a downstream electric system 110. Downstream electric system 110 can perform the functions of calculating the rate of flow to act as a flow meter, or to act as a flow totalizer. A variety of electronic processing systems are available to provide these functions.

Vortex shedding signal processor 111 processes the AC component of the flow output representing very low flow. The mode can be used alone or with flow measurements. In a low flow condition, the AC signal output representing the vortex shedding AC signal will predominate as an initial on/off detection.

The system can also be used as a combined flow meter, flow totalizer, flow switch and low flow detectors with the signal processing illustrated in the schematic block diagram of FIG. 21. The output of the photodetector transducer produced by either transmission reflection or absorption 112 is fed to signal smoothing filter 114 as before. As previously described, signal smoothing filter 114 is an element in the system because the signal-to-noise ratio condition, presented by turbulence may be corrected as part of the signal processing electronics. The output of smoothing filter 114 is then fed to amplifier 116 and signal processor 118 for conversion to a linear output via a microprocessor. The output of the microprocessor can then be fed to down stream electronics 122 for use as a flow meter or flow totalizer, etc.

The output from the signal processor 118 is also fed to a set point comparator 120 to provide single or multiple flow switch set points. Thus, the system illustrated in FIG. 21 can function in three different modes. The system can be used as a flow meter, a flow totalizer or as a single or multiple set point comparator for flow switch actuation including low flow detection.

Vortex shedding signal processor 121 processes the AC component of the flow output representing very low flow. The mode can be used alone or with flow measurements. In a low flow condition the AC signal output representing the vortex shedding AC signal will predominate as an initial on/off flow detection.

Obviously, many modifications and variations of the invention are possible in light of the above teachings. It is therefore to be understood that the full scope of the invention is not limited to the details disclosed herein, but only by the claims appended hereto and may be practiced otherwise but as specifically described.

What is claimed is:

1. A fluid responsive monitoring system for monitoring the flow of a fluid comprising;

a housing mounted for extending into and intercepting the flow of said fluid;

an emission source mounted in said housing;

an emission receiving means mounted in said housing opposite said emission source;

a flexible flow sensing bending beam mounted on said housing and extending into the flow of said fluid;

low flow detecting means comprising means for detecting vibration of said bending beam;

selective means mounted on said bending beam for selectively controlling the transmission of emissions from said emission source to said emission receiving means;

electronic processing means for processing the output of said emission receiver;

whereby the rate of flow of said fluid can be detected, metered and controlled.

2. The system according to claim 1 in which said source of emissions is a light emitting diode.

3. The system according to claim 1 in which said source of emissions is an infrared source.

4. The system according to claim 1 in which said source of emissions is an ultraviolet source.

5. The system according to claim 1 in which said selective means is a blocking target mounted on said bending beam for blocking emissions from reaching said emission receiving means.

6. The system according to claim 5 in which said blocking target is a shaped blocking target for selectively blocking emissions from reaching said emission receiving means.

7. The system according to claim 6 in which said blocking target is a straight edge rectangular target.

8. The system according to claim 6 in which said blocking target has a shaped reflective surface.

9. The system according to claim 8 in which said shaped reflective surface is a surface that is partially reflective and partially non-reflective.

10. The system according to claim 9 in which said partially reflective and non-reflective surfaces are triangular.

11. The system according to claim 10 in which said partially reflective and partially non-reflective surfaces are substantially equal.

12. The system according to claim 9 in which said partially reflective and non-reflective surfaces are rectangular.

13. The system according to claim 12 in which said partially reflective and partially non-reflective surfaces are equal.

14. The system according to claim 9 in which said partially non-reflective surface comprises an aperture in said blocking target.

15. The system according to claim 14 in which said aperture is in alignment with said emission source when said bending beam is at rest.

16. The system according to claim 14 in which said aperture is out-of-alignment with said emission source when said bending beam is at rest.

17. The system according to claim 6 in which said shaped blocking target is a blade having an aperture.

18. The system according to claim 17 in which said aperture is in alignment with said emission source when said bending beam is at rest.

19. The system according to claim 17 in which said aperture is out of alignment with said emission source when said bending beam is at rest.

20. The system according to claim 1 in which said source of emissions is a broad spectrum visible source.

21. The system according to claim 1 including means to enhance vortex shedding of said bending beam.

22. The system according to claim 21 in which said means to enhance said vortex shedding comprises appendages on said bending beam to increase turbulence.

23. The system according to claim 22 in which said appendages comprise V-shaped flanges along lateral edges of said bending beam.

24. The system according to claim 23 including signal conditioning means for processing an AC and DC output from said emission receiving means.

* * * * *

UNITED STATES PATENT AND TRADEMARK OFFICE
CERTIFICATE OF CORRECTION

PATENT NO. : 5,847,288
DATED : December 8, 1998
INVENTOR(S) : Harold D. Hutchinson It is certified that error appears in the above-identified patent and that said Letters Patent is hereby corrected as shown below:

Column 8, line 64, and Column 9, lines 10 and 18, delete "(Ad)" and insert -- (▲d) --.

Signed and Sealed this

Eighteenth Day of July, 2000

Attest:

Q. TODD DICKINSON

*Attesting Officer*     *Director of Patents and Trademarks*